United States Patent

[11] 3,553,370

[72] Inventor Bernard M. Rosenheck
Spring Valley, N.Y.
[21] Appl. No. 692,789
[22] Filed Dec. 22, 1967
[45] Patented Jan. 5, 1971
[73] Assignee Litton Systems, Inc.
Beverly Hills, Calif.
a corporation of Maryland

[54] PHASING SYSTEM FOR FACSIMILE TRANSMITTER AND RECEIVER UTILIZING PULSE GENERATING AND COUNTING DEVICES
10 Claims, 2 Drawing Figs.

[52] U.S. Cl. .......... 178/69.5, 178/53
[51] Int. Cl. .......... H04l 5/22, H04l 7/08
[50] Field of Search .......... 178/69.5F, 69.5, 53, 52; 179/15SVNC; 328/63,72—74, 179; 317/6; 318/(Inquiry)

[56] References Cited
UNITED STATES PATENTS

| | | | |
|---|---|---|---|
| 3,367,110 | 2/1968 | Leeson .......... | 317/6 |
| 3,368,108 | 2/1968 | Helm .......... | 317/6 |

*Primary Examiner*—Richard Morray
*Assistant Examiner*—John C. Martin
*Attorney*—Alan C. Rose, and Alfred B. Levine

ABSTRACT: A phasing system for two synchronous rotating members, such as the scanning members of the transmitter and receiver of a facsimile system, in which an electronic pulse counter is employed to determine the phase discrepancy between rotating members, and the phase-adjusting means to effect phase correction is controlled by said pulse counter.

PHASING SYSTEM FOR FACSIMILE TRANSMITTER AND RECEIVER UTILIZING PULSE GENERATING AND COUNTING DEVICES

CROSS REFERENCE TO A RELATED APPLICATION

A phasing system responsive to phasing pulses from a facsimile transmitter and a facsimile recorder is disclosed in copending application, Ser. No. 363,775 filed Apr. 30, 1964, now U.S. Pat. No. 3,385,928, issued on May 28, 1968, and assigned to the assignee of the present invention.

BACKGROUND OF THE INVENTION

The present invention relates to a system and apparatus for phasing the angular position of a synchronous rotating member to effect phase coincidence with a second synchronously rotating member. In prior phasing systems, commonly employed in facsimile recording for example, desired accuracy of phasing adjustment has been difficult to obtain, especially where the rotative speed of the synchronous members is relatively high. The invention provides accurate phasing adjustment in high-speed scanning systems, for example up to at least 0.1 percent phasing accuracy at 12,000 r.p.m. or more.

The object of the invention is to effect phasing with any desired accuracy, with rapid control means which imposes no theoretical limit to the synchronous systems speed, in contradistinction to prior phasing systems which did not provide accurate and reliable phasing of high-speed rotating systems. In high-speed facsimile transmitters, for example, where the duration of a scan line is measured in milliseconds, phasing has presented problems which the present invention is designed to overcome.

SUMMARY OF THE INVENTION

In accordance with the invention, the phasing pulses from two synchronously rotating members are utilized to control the stepping of an electronic pulse counter, the count representing the phase discrepancy between said members at the commencement of the phase correction operation. The control circuits comprise flip-flops and gates which, being electronic, operate with no appreciable time lag. Then phase correction is effected, normally in a few seconds, in accordance with the operation of the pulse counter. Thus the speed of the synchronous system has no effect on the phasing operation and the accuracy of phasing may be adjusted to meet any desired requirement.

DESCRIPTION OF THE PREFERRED EMBODIMENT

Figure 1:
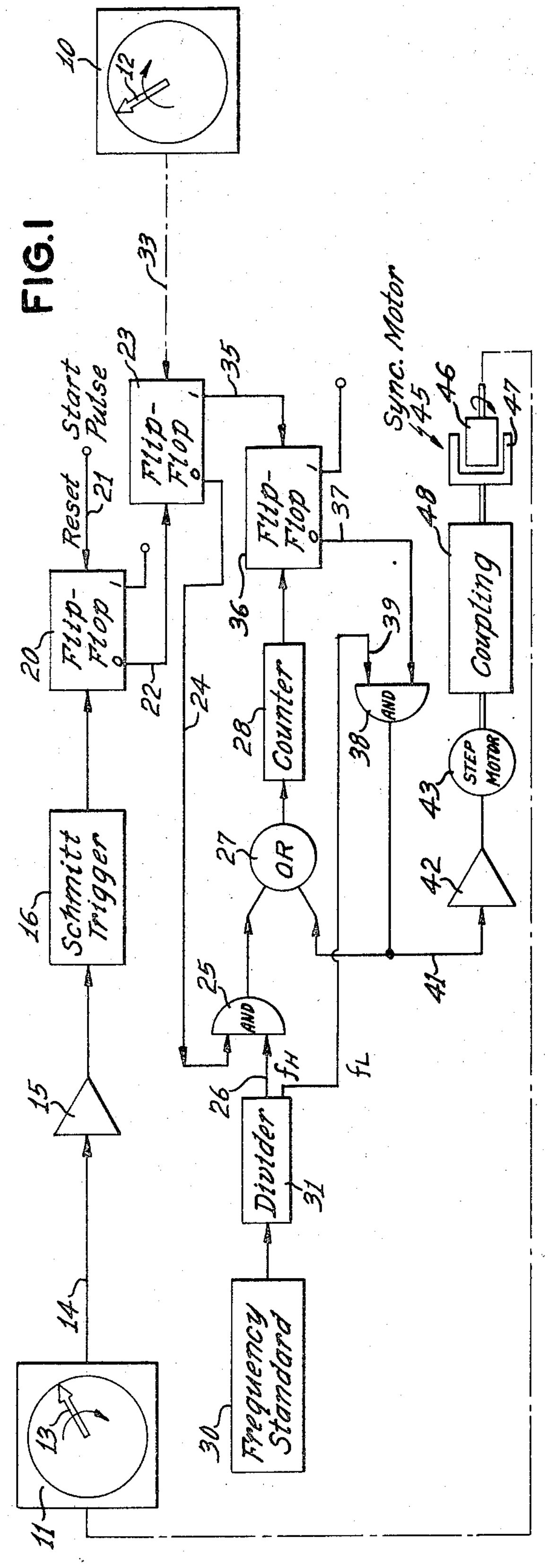
FIG. 1 illustrates a phasing system embodying the invention for phasing the synchronous recording mechanism of a facsimile receiver with a transmitter.

Referring to the drawing, 10 and 11 represent the scanning and recording mechanisms of a facsimile transmitter and recorder, respectively, having rotating members driven in synchronism. The arrows 12 and 13 represent the relative phase positions of he members to be phased when the phasing operation is initiated.

The present invention may be utilized for phasing or framing driven mechanisms of various kinds which are to be maintained in synchronism and in phase even when located at spaced points but, for the purposes of explanation, the invention will be described in connection with a facsimile system embodying a transmitter and a recorder connected through a signal line or channel. Both facsimile units may be provided with conventional pulse-generating means which indicate the relative phase positions of the transmitter scanner and the recorder. The transmitter 10 may be assumed for purposes of explanation to comprise a scanner consisting of a rotating copy drum or cylinder for supporting the copy which is scanned by conventional optical scanning mechanism. The synchronously rotating drum in the transmitter 10 may be arranged to generate a phasing pulse at the beginning of each scanning line, said phasing pulse or starting pulse being employed to determine the phase relationship of the recording apparatus by comparing periodic pulses generated by the recorder 11 with said phasing pulses. Thus the time spacing between the pulses from the scanner 10 and the recording mechanism 11 is a function of the displacement from the desired phase relation and coincidental pulses (or pulses having a predetermined time displacement) indicate the in-phase relation of the scanner and recorder mechanism, 10 and 11.

In accordance with the preferred embodiment of the invention, electronic switching means is employed to effect phase correction. Phasing pulses are generated in the usual manner from the receiver 11 in the conductor 14, amplified if required by amplifier 15 and shaped by a Schmitt trigger 16 to regenerate the pulse wave shape to enable it to set flip-flop 20. Flip-flop 20 may be of the reset-set type. To start phasing, a starting pulse (locally generated at receiver 11) is applied to conductor 21 to reset flip-flop 20. The next pulse from the trigger circuit 16 will set flip-flop 20, reversing the polarity of the output voltage on conductor 22 connected to a second flip-flop 23. This sets flip-flop 23, causing its output on conductor 24 to go negative, which gates the AND circuit 25. Pulses at a constant frequency $f_H$ *are then impressed through AND circuit 25 and through OR circuit 27 into an electronic pulse counter 28.*

The constant-frequency pulses on conductor 26 may be derived from any suitable source which is a multiple of the rotative speed of the synchronous members, such as the frequency standard 30 which controls the scanning rate of the receiver 11. A frequency divider 31 is sometimes used to lower the pulse frequency $f_H$. The pulse counter 28 could be a preset counter such as the Hewlett-Packard Model 5214L counter, manufactured by Hewlett-Packard, Palo Alto, Calif. 94304, which generates an output control pulse when the count reaches a preset number C and then resets to zero. The accuracy of phasing is determined by the maximum counting capacity of the counter 28. If, for example, C = 1,000, then the phasing accuracy will be one part in a thousand or 0.1 percent phasing accuracy.

The counter 28 is set for a predetermined count C and the frequency $f_H$ is selected so that C-counts or pulses would be applied during the time interval of one scan. Thus the number of pulses N stored in the counter 28 when the phasing pulse on conductor 33 from the transmitter 10 occurs represents the phase error of the system. The counter 28 is gated off constant frequency $f_H$ at this instant by resetting flip-flop 23 to close the AND gate 25. At the same time the voltage on conductor 35 resets the flip-flop 36 to reverse the polarity of voltage in conductor 37 to open the AND gate 38. Control pulses from divider 31 on conductor 39 at frequency $f_L$, which may be lower and need not bear any particular relation to $f_H$, step the counter 28 and simultaneously operate the phase correction device which operates to phase the receiver 11 with the transmitter 10. The number of counts N stored in the counter, representing the phase error of the system, also represents the amount by which the receiving system 11 leads the transmitting system 10. The total count C minus the stored count N represents the amount by which the receiving system 11 lags the transmitting system 10.

The proper amount of phase lag correction is thus determined by the counter 28. The counter continues its count at the lower rate $f_L$ until it reaches its maximum count C, at which time it will automatically reset back to zero and generate an output pulse which is used to set flip-flop 36, thereby gating off the source of control signal on conductor 39 to stop the counter and the phase correction operated thereby. The two rotating members of the scanning system are then in phase and continue to rotate in synchronism. Obviously instead of stepping the counter 28 forward, a reversible counter can be made to count back to zero count at the $f_L$ rate and simultaneously to correct the amount of phase lead in the system.

As shown by way of example the phase correction device is a Sigma stepping or impulse-type of motor 43 which is stepped by each applied impulse at a rate up to 400 steps per second. The control pulses for the stepping motor 43 are applied to the motor through the conductor 41 and amplifier 42. The motor 43 is shown as connected mechanically through a resilient decoupling device 48 to the stator 47 of the synchronous driving motor 45 of the scanning system, the rotor of which is indicated at 46. Phase correction is thus effected by the driving action of stepping motor 43 which rotates the stator 47 of the synchronous driving motor 45. This causes the rotor 46 to be offset in the direction of rotation by the additional amount of stator rotation for advancing the receiver 11 and correcting the phase lag thereof. This correction method is similar to that shown in my prior patent, referred to above. Other equivalent phase correcting means responsive to a series of correction pulses may be used as well known in the art.

Figure 2:
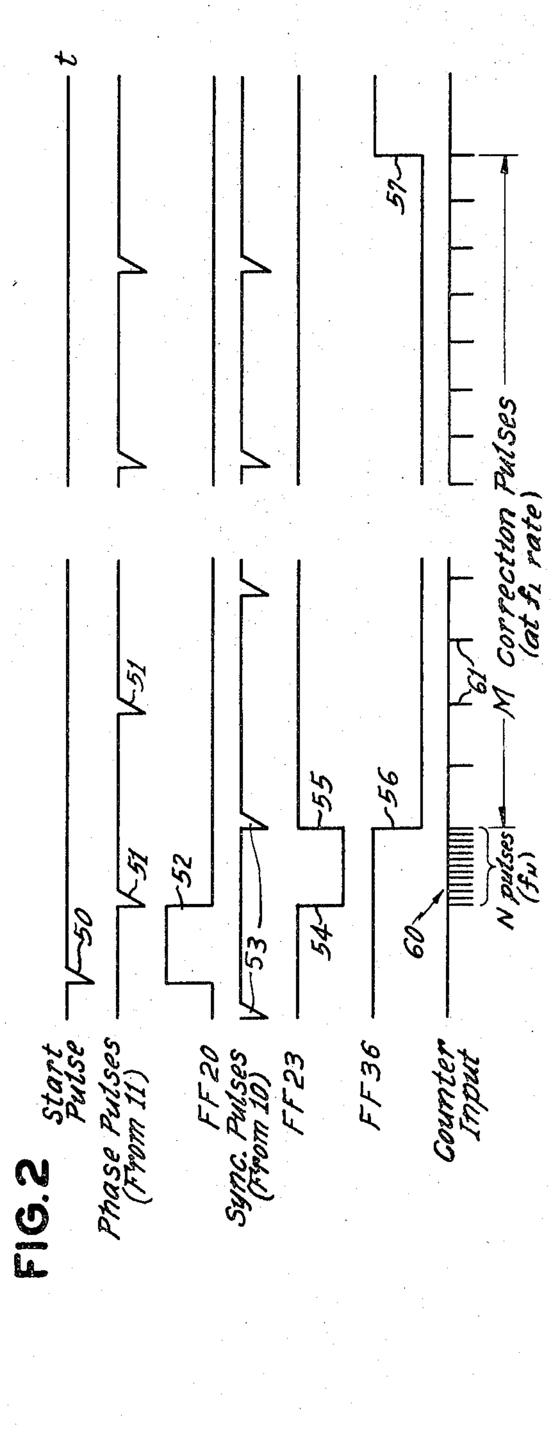
FIG. 2 is a timing diagram of the system shown in FIG. 1.

The timing diagram of FIG. 2 shows the timing of the various control elements of the system described above. At the start of phasing, a start pulse 50 is applied to flip-flop 20, generating a positive-going output over line 22. The next phasing pulse 51 from the receiver 11 sets flip-flop 20, causing its output to go negative as indicated at 52, which sets flip-flop 23 as indicated at 54. The negative gate output of flip-flop 23 gates on the AND circuit 25 and the counter 28 begins to count the pulses 60. The next phasing pulse 53 from the transmitter 10 reset flip-flop 23 to shut off gate 25 and resets flip-flop 36. The AND gate 38 opens and the counter 28 and phase-correcting device 43—47 respond to the correction pulses 61 until the counter sets the flip-flop 36 as indicated at 57. The amount of phase correction thus depends upon the number of correction pulses M necessary to bring the counter to a count of C, i.e., C=N+M.

While one embodiment of the invention has been shown and described in detail for the purpose of explaining the underlying principles thereof, various changes in the phasing system may be made without departing from the scope of the invention. Thus by way of illustration and not of limitation, different forms of gating and switching devices may be substituted for those shown in the drawing, and an electromechanical counter may be used, as will be apparent to those skilled in the art. However the utilization of electronic counting and switching means provides enhanced reliability of operation, and the important advantages of no theoretical limits to the accuracy of phasing and the speed of the synchronous members to be brought into phase. Furthermore, while the invention has been described as applied to the phasing of facsimile machines, it is equally adapted for phasing other synchronously rotating elements.

I claim:

1. A system for synchronously phasing two rotating members, comprising:

means for generating phasing pulses representing the angular positions of the respective members;

means for adjusting the angular position of one of said members to effect phase coincidence with the other member;

means for generating electrical pulses at a constant rate;

means connected to receive said generated phasing pulses and said constant-rate pulses occurring during the interval between a pair of phasing pulses from the two rotating members; and means responsive to the counting means for controlling said adjusting means to the extent determined by said counted constant-rate pulses to effect phase correction.

2. A phasing system according to claim 1, in which switching means is provided to connect the counting means to said constant-rate pulse generating means upon the occurrence of a phasing pulse from one of said rotating members, and to disconnect said counting means upon the occurrence of a phasing pulse from the other of said rotating members.

3. A phasing system according to claim 2, in which second switching means is provided to connect the counting means to said constant-rate, pulse-generating means and to connect the constant-rate, pulse-generating means to said means for adjusting upon the occurrence of a phasing pulse from the other of said rotation members and to disconnect said counting and adjusting means when said extent of adjustment is reached as determined by said counted constant-rate pulses.

4. A system for synchronously phasing two rotating members, comprising:

means for generating first and second phasing pulses representing the angular positions of the respective members;

means for adjusting the angular position of one of said members to effect phase coincidence with the other member;

means for generating electrical pulses at a constant rate;

means connected to receive said generated first and second phasing pulses and said constant-rate pulses for counting the number of said constant-rate pulses occurring during the interval between said first and second phasing pulses from the two rotating members and for counting thereafter to a predetermined count; and means responsive to said counting means for controlling said adjustment means from said second phasing pulse until said predetermined count is reached for effecting phase correction corresponding to the number of pulses required until said predetermined count is reached.

5. A system for synchronously phasing two rotating members, comprising:

means for rotating said members;

means for generating phasing pulses representing the angular positions of the respective members;

means for adjusting the angular position of one of said rotating members to effect phase coincidence with the other member;

a pulse counter for generating an output at a predetermined count;

means responsive to said phasing pulse-generating means for stepping said pulse counter to a point representing the amount of phase discrepancy between said rotating members; and second means responsive to said phasing pulse-generating means for stepping said pulse counter to said predetermined count and simultaneously for stepping said means for adjusting to effect phase correction by adjusting the phase relation of one of said rotating members in accordance with the operation of said pulse counter by said second means.

6. A system for synchronously phasing two rotating members, comprising:

means for generating phasing pulses representing the angular positions of the respective members;

means for adjusting the angular position of one of said members to effect phase coincidence with the other member;

an electronic pulse counter for generating a control signal at a predetermined count;

a pulse source for stepping said counter;

first means for connecting said pulse source to said counter in response to a phasing pulse from one of said rotating members;

second means for connecting said pulse source to said counter and to said means for adjusting in response to the next occurring phasing pulse from the other one of said members thus adjusting said angular position of one of said members in response to said subsequent pulses; and said counter connected to said second means for applying said control signal thereto and disconnecting said pulse source from said counter and said means for adjusting when said predetermined count is reached, thereby adjusting one of said members into synchronization with the other.

7. A system for synchronously phasing two rotating members, comprising:

phase pulse-generating means for representing the angular positions of said rotating members;

adjusting means for adjusting the angular position of one of said members to effect phase synchronization with the other member;

pulse counting means for generating an output signal at a predetermined count;

a source of pulses for generating pulses at high and lower rates;

first switching means for connecting said source of high-rate pulses to pulse said counter means in response to a phase pulse from one of said rotating members;

second switching means for connecting said source of lower rate pulses to pulse said counter means and to pulse said adjusting means in response to a second phase pulse from the second of said rotating members, said lower rate pulses thus energizing said adjusting means for adjusting said angular position of one of said members;

said counting means connected to said second switching means for disconnecting said source of lower rate pulses from said adjusting means and terminating the adjustment of the angular position of one of said members when said predetermined count is reached, thus synchronizing one of said members with the other.

8. A phasing system according to claim 7, wherein said adjusting means comprises:

stepping motor means connected to said second switching means for receiving said lower rate pulses therefrom;

drive motor means having a stator and rotor for driving one of said rotating members; and said stepping motor means connected to said drive motor means for causing the rotation of said stator for advancing the rotor of said drive motor during each of said lower rate pulses received thereby.

9. A phasing system according to claim 7, wherein said first switching means comprises:

first and second gating means serially connected to one of said rotating members for generating a control signal in response to said phase pulse therefrom; and third gating means connected to receive said control signal from said second gating means for passing said high-rate pulses to said counter means.

10. A phasing system according to claim 9, wherein said second switching means comprises:

said second gating means also connected to said second rotating member for generating a second control signal in response to said phase pulse therefrom which disables said third gating means;

fourth gating means connected to said second gate means for generating a control signal in response to said second control signal from said second gate; and fifth gating means connected to receive said control signal from said fourth gating means for passing said lower rate pulses to said counter means and said adjustable means.